US009219508B1

(12) United States Patent
Veysoglu et al.

(10) Patent No.: US 9,219,508 B1
(45) Date of Patent: Dec. 22, 2015

(54) INTERFERENCE MITIGATION FOR A COMMUNICATIONS SYSTEM

(71) Applicant: The Boeing Company, Chicago, CA (US)

(72) Inventors: Murat E. Veysoglu, Cypress, CA (US); Lisa Kuo, Rancho Palos Verdes, CA (US)

(73) Assignee: THE BOEING COMPANY, Chicago, IL (US)

( * ) Notice: Subject to any disclaimer, the term of this patent is extended or adjusted under 35 U.S.C. 154(b) by 213 days.

(21) Appl. No.: 13/959,800

(22) Filed: Aug. 6, 2013

(51) Int. Cl.
*H04W 4/00* (2009.01)
*H04B 1/10* (2006.01)

(52) U.S. Cl.
CPC ....................................... *H04B 1/10* (2013.01)

(58) Field of Classification Search
USPC .......... 455/427, 429, 67.11, 63.1, 67.13, 12.1
See application file for complete search history.

(56) References Cited

U.S. PATENT DOCUMENTS

| 4,672,378 | A | 6/1987 | Drabowitch et al. |
| 5,343,211 | A | 8/1994 | Kott |
| 5,594,941 | A * | 1/1997 | Dent .......................... 455/13.4 |
| 6,275,188 | B1 | 8/2001 | Chen |
| 7,751,854 | B2 | 7/2010 | Leifer et al. |
| 7,825,857 | B2 | 11/2010 | Lackey et al. |
| 8,064,824 | B2 * | 11/2011 | Karabinis .................. 455/13.4 |
| 8,412,126 | B2 | 4/2013 | Karabinis et al. |
| 2004/0113835 | A1 * | 6/2004 | Jones et al. ................ 342/160 |
| 2007/0211786 | A1 * | 9/2007 | Shattil ........................ 375/141 |
| 2011/0021153 | A1 * | 1/2011 | Safavi ....................... 455/63.1 |

FOREIGN PATENT DOCUMENTS

| EP | 1494313 A1 | 5/2005 |
| EP | 2088449 B1 | 6/2012 |

* cited by examiner

*Primary Examiner* — Fayyaz Alam
(74) *Attorney, Agent, or Firm* — Yee & Associates, P.C.

(57) ABSTRACT

A method for processing communications signals. The communications signals are received from an area. The communications signals are received from a portion of the area in which interference is present. The interference is reduced from the communications signals received from the area using the communications signals received from the portion of the area.

18 Claims, 5 Drawing Sheets

INTERFERENCE MITIGATION FOR A COMMUNICATIONS SYSTEM

BACKGROUND INFORMATION

1. Field

The present disclosure relates generally to communications and, in particular, to the transmission of communications signals. Still more particularly, the present disclosure relates to a method and apparatus for reducing interference with communications signals.

2. Background

Communications between different geographic areas on the earth are often facilitated through the use of satellites. These satellites may serve as a relay for communications signals from one location to another location. These locations may be on land, on the water, in the air, or other locations with respect to the earth. In some cases, communications may be relayed between the location on the earth and a location in outer space such as a space station.

The communications signals may be received as a beam from a source and then relayed or retransmitted as another beam to a destination. These communications signals may be radio frequency signals. With these types of communications, interference may occur. The interference may be from unintentional or intentional types of interference. Unintentional interference may result from installation problems, operator error or other environmental conditions.

Intentional interference may be caused by the transmission of manmade radio frequency signals. For example, a first source of first communications signals may be configured to use the satellite to relay information to another location. A second source of second communications signals may be communications signals that are accidentally or intentionally directed at the satellite. In other situations, the second communications signals may be correctly pointed to the satellite but use incorrect polarization.

These and other situations may result in the second communications signals interfering with reception of the first communications signals. The interference may reduce the quality of video or audio in the communications signals. The interference may also increase the bit error rate to an undesirable level.

Therefore, it would be desirable to have a method and apparatus that take into account at least some of the issues discussed above, as well as other possible issues.

SUMMARY

In one illustrative embodiment, an apparatus comprises a main reflector antenna and an auxiliary reflector antenna. The main reflector antenna is configured to receive communications signals from an area. The auxiliary reflector antenna is configured to receive the communications signals from a portion of the area in which interference is present.

In another illustrative embodiment, a satellite antenna system comprises a main reflector antenna on a satellite, an auxiliary reflector antenna on the satellite, and a signal processor on the satellite. The main reflector antenna is configured to receive communications signals from an area. The auxiliary reflector antenna is configured to receive the communications signals from a portion of the area in which interference is present. The signal processor is configured to reduce the interference in the communications signals from the area received by the main reflector antenna using the communications signals from the portion of the area in which the interference is present.

In yet another illustrative embodiment, a method for processing communications signals is presented. The communications signals are received from an area. The communications signals are received from a portion of the area in which interference is present. The interference is reduced from the communications signals received from the area using the communications signals received from the portion of the area.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that some solutions may employ the use of large multi-feed antennas. These types of antennas may be more complex and expensive than desired.

The illustrative embodiments also recognize and take into account that an auxiliary antenna may modify side lobes to reduce interference. This type of technique, however, may restrict the design of the main antenna to take into account the presence of interference. As a result, limitations to the shape of the antenna may be present, especially when the antenna is a reflector antenna.

Thus, the illustrative embodiments provide a method and apparatus for reducing interference. In one illustrative example, the apparatus comprises a main reflector antenna and an auxiliary reflector antenna. The main reflector antenna is configured to receive communications signals from an area. The auxiliary reflector antenna is configured to receive the communications signals from a portion of the area in which interference is present. The communications signals received from the portion of the area in which the interference is present by the auxiliary reflector antenna may be used to reduce interference in communications signals received from the area by the main reflector antenna.

Figure 1:
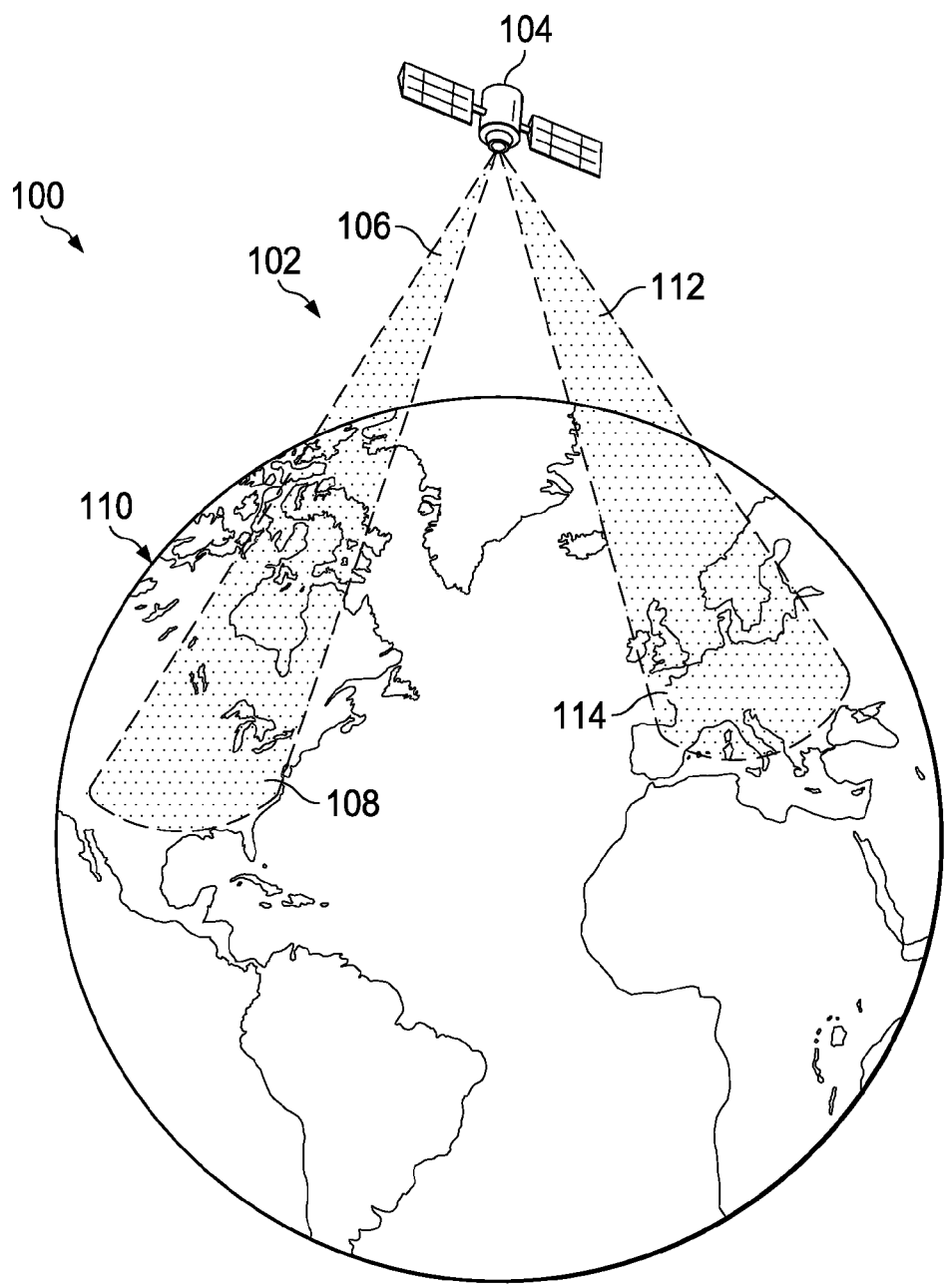
FIG. 1 is an illustration of a communications environment in accordance with an illustrative embodiment.

With reference now to the figures, and in particular with reference to FIG. 1, an illustration of a communications environment is depicted in accordance with an illustrative embodiment. In this depicted example, communications environment 100 includes communications system 102.

As depicted, communications system 102 includes satellite 104. In this illustrative example, satellite 104 may receive communications signals in the form of beam 106 from first geographic area 108 on earth 110. In this illustrative example, first geographic area 108 may be North America. Satellite 104 may relay or retransmit information in beam 112 to second geographic area 114. In this illustrative example, second geographic area 114 may be Europe.

As depicted, interference may occur with the reception of beam 106 from first geographic area 108. In this illustrative example, interference is intentional interference. In this illustrative example, intentional interference may be caused by manmade signals with the intent to disrupt communications, while unintentional interference may be caused by installation mistakes, operator error, or environmental sources.

For example, interference may be caused by another transmitter that has been accidentally pointed at satellite 104. In another illustrative example, the interference may be a mistake in polarization for communications signals sent to satellite 104. In still another illustrative example, intentional interference may be communications signals generated with an intent to jam the communications signals in beam 106. In one illustrative example, satellite 104 may be configured to reduce interference with communications signals in beam 106 that are received by satellite 104.

Figure 2:
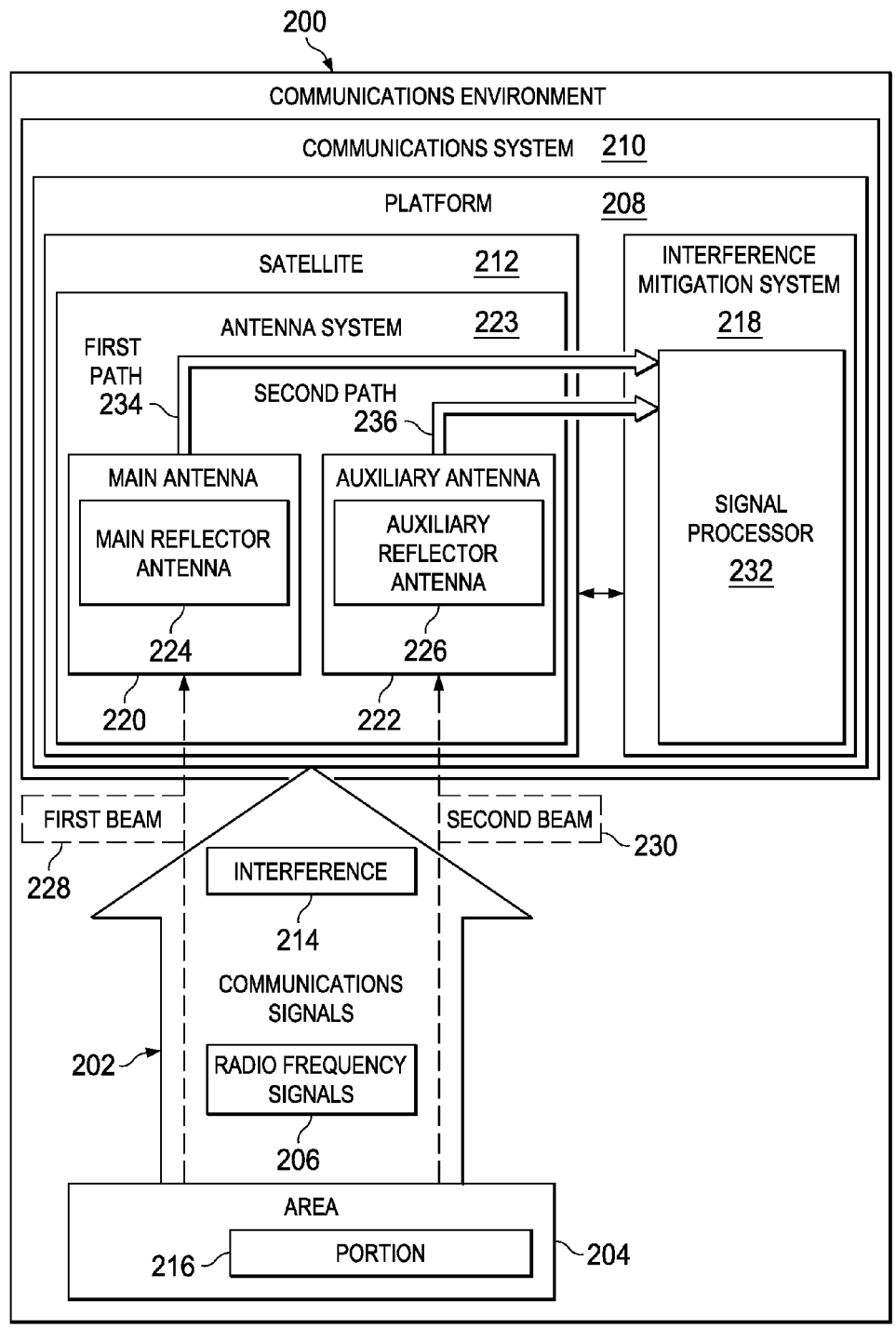
FIG. 2 is an illustration of a block diagram of a communications environment in accordance with an illustrative embodiment.

With reference to FIG. 2, a block diagram of a communications environment is depicted in accordance with an illustrative embodiment. Communications environment 100 in FIG. 1 is an example of one implementation of communications environment 200 in FIG. 2.

As depicted, communications signals 202 may be transmitted from area 204. Area 204 may be on earth, in outer space, or some other location. In the illustrative example, communications signals 202 may be radio frequency (RF) signals 206. For example, communications signals 202 may have a frequency from about 3 KHz to about 300 GHz.

In the illustrative example, communications signals 202 are received from area 204 at platform 208 in communications system 210. As depicted, platform 208 is satellite 212.

Interference 214 may be present in communications signals 202. In this illustrative example, interference 214 is not from natural sources. Instead, interference 214 may be radio frequency signals transmitted from a manmade source. As depicted, interference 214 may be received in communications signals 202 from portion 216 of area 204.

In the illustrative example, communications system 210 includes interference mitigation system 218. A portion or all of interference mitigation system 218 may be located on platform 208, which takes the form of satellite 212 in this particular example.

As depicted, interference mitigation system 218 is configured to reduce interference 214 received in communications signals 202. Interference mitigation system 218 and the different components in interference mitigation system 218 may be implemented in software, hardware, firmware or a combination thereof. When software is used, the operations performed by interference mitigation system 218 may be implemented in program code configured to run on a processor unit. When firmware is used, the operations performed by interference mitigation system 218 may be implemented in program code and data, and stored in persistent memory to run on a processor unit. When hardware is employed, the hardware may include circuits that operate to perform the operations in interference mitigation system 218.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Reducing interference 214 may be reducing interference 214 to a desired level. In some cases, the reduction of interference 214 to a desired level may be a total elimination of interference 214.

As depicted, communications system 210 also includes main antenna 220 and auxiliary antenna 222. These components are part of antenna system 223 in communications system 210.

In this example, the antennas are physically associated with satellite 212. In this manner, antenna system 223 may be a satellite antenna system in this illustrative example. When one component is "physically associated" with another component, the association is a physical association in the depicted examples. For example, a first component, main antenna 220, may be considered to be physically associated with a second component, satellite 212, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both.

In the illustrative example, main antenna 220 and auxiliary antenna 222 may be in different physical locations and separated from each other by a distance. The separation may be such that auxiliary antenna 222 does not affect or change the manner in which communications signals 202 are received by auxiliary antenna 222. This distance may be, for example, greater than the diameter of the main antenna 220, auxiliary antenna 222, or both.

In the illustrative example, main antenna 220 may be main reflector antenna 224, and auxiliary antenna 222 may be auxiliary reflector antenna 226. A reflector antenna includes a reflector and a number of feed elements. A "number of," as used herein with respect to items, means one or more items. For example, a number of feed elements is one or more feed elements.

The reflector is configured to reflect communications signals 202, such as radio frequency signals 206. The reflector may be used to direct, focus, or both direct and focus, communications signals 202 to the number of feed elements.

A feed element is the part of the antenna which actually converts the radio frequency currents to radio waves. The feed element may also be referred to as a feed antenna.

In the illustrative example, main reflector antenna 224 is configured to receive communications signals 202 from area 204. Auxiliary reflector antenna 226 is configured to receive communications signals 202 from portion 216 of area 204.

In other words, auxiliary reflector antenna 226 is configured to receive a subset or portion of communications signals 202 that are received by main reflector antenna 224. For example, communications signals 202 from area 204 are received as first beam 228 by main reflector antenna 224 and communications signals 202 from portion 216 of area 204 are received as second beam 230 by auxiliary reflector antenna 226.

In the illustrative example, communications signals 202 are from portion 216 of area 204 in which interference 214 is present. In these illustrative examples, signal processor 232 is configured to change portion 216 of area 204 for communications signals 202 received by auxiliary reflector antenna 226 such that portion 216 includes interference 214 in communications signals 202. In particular, signal processor 232 may steer or point auxiliary reflector antenna 226.

The change in portion 216 within area 204 may be performed in a number of different ways. For example, at least one of physical movement of auxiliary reflector antenna 226, beam forming, spatial filtering, or other techniques may be used for receiving communications signals 202 from portion 216.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Additionally, signal processor 232 is configured to reduce interference 214. More specifically, signal processor 232 is configured to reduce interference 214 in communications signals 202 from area 204 received by main reflector antenna 224 using communications signals 202 received by auxiliary reflector antenna 226 from portion 216 of area 204 in which interference 214 is present.

In this illustrative example, signal processor 232 is configured to receive communications signals 202 received by main reflector antenna 224 through first path 234. Signal processor 232 is also configured to receive communications signals 202 received by auxiliary reflector antenna 226 through second path 236. These paths may be formed using wires. In the illustrative example, communications signals 202 are received as electromagnetic radiation by main reflector antenna 224 and auxiliary reflector antenna 226 and converted into an electrical form. These different signals may be optical signals in other illustrative examples.

Also, signal processor 232 is configured to take into account a difference between first path 234 and second path 236 in reducing interference 214 in communications signals 202 from area 204 received by main reflector antenna 224 using communications signals 202 from portion 216 of area 204 received by auxiliary reflector antenna 226 in which interference 214 is present. In other words, factors such as delay, phase differences, and other factors with respect to changes caused by the paths may be taken into account when reducing interference 214 in communications signals 202.

In this manner, interference mitigation system 218 may reduce interference 214 received from portion 216 of area 204 in communications signals 202 received by main reflector antenna 224. The reduction of interference 214 may be performed even when main reflector antenna 224 and auxiliary reflector antenna 226 are physically separated from each other by some distance.

The illustration of communications environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although platform 208 has been described as satellite 212, platform 208 may also take other forms in other illustrative examples. In different illustrative examples, platform 208 may be selected from one of a mobile platform, a stationary platform, a land-based structure, an aquatic-based structure, a space-based structure, a spacecraft, a space station, an aircraft, a surface ship, a tank, a personnel carrier, a train, an automobile, a bridge, a dam, a building, or some other suitable structure.

As another example, communications signals 202 may be received as electromagnetic radiation by main reflector antenna 224 and auxiliary reflector antenna 226 and converted into an optical form or light rather than in an electrical form.

Figure 3:
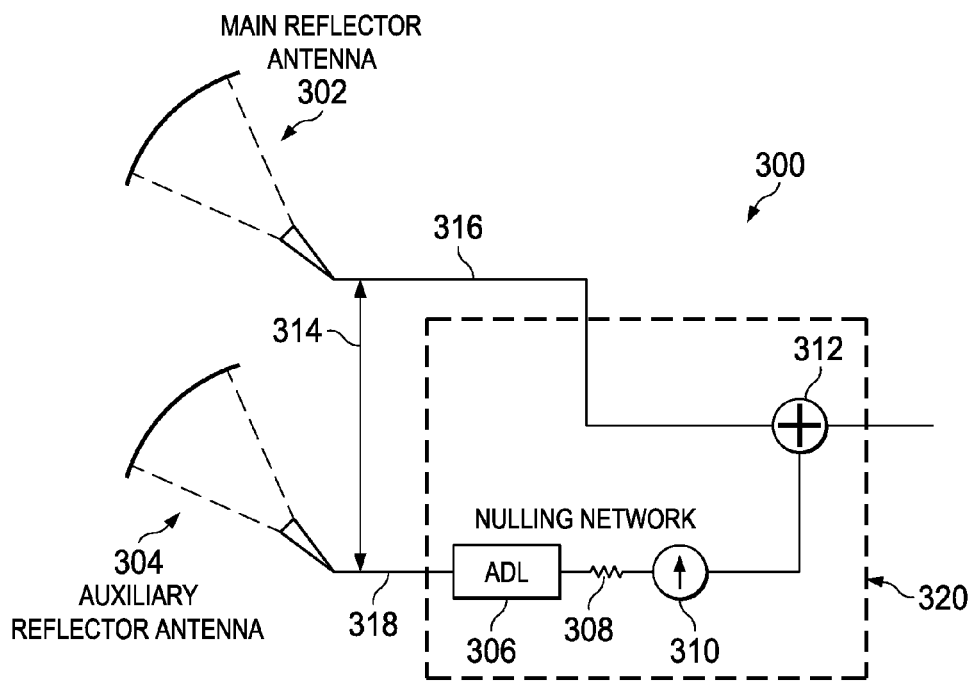
FIG. 3 is an illustration of a diagram of a communications system in accordance with an illustrative embodiment.

Turning next to FIG. 3, an illustration of a diagram of a communications system is depicted in accordance with an illustrative embodiment. As depicted, communications system 300 is an implementation for communications system 210 in FIG. 2.

In this illustrative example, communications system 300 includes a number of different components. As depicted, communications system 300 includes main reflector antenna 302, auxiliary reflector antenna 304, adjustable delay line (ADL) 306, attenuator 308, phase shifter 310, and summing unit 312.

In this illustrative example, main reflector antenna 302 and the auxiliary reflector antenna 304 are separated by distance 314. Distance 314 may be, for example, 2 inches, 1 foot, 5 feet, or some other suitable distance.

In this illustrative example, auxiliary reflector antenna 304 has a higher gain and narrower beam than main reflector antenna 302. For example, auxiliary reflector antenna 304 may have a higher gain and a narrower beam than main reflector antenna 302. Main reflector antenna 302 may have a reflector that is shaped to provide a wider coverage area resulting in a wider beam having a lower gain as compared to auxiliary reflector antenna 304.

With the beam generated by auxiliary reflector antenna 304 being narrower than the beam generated by main reflector antenna 302, the nulling of jammers outside of the area of intended coverage by main reflector antenna 302 may result in a reduced amount of distortion of the beam generated by main reflector antenna 302.

As depicted, main reflector antenna 302 receives communications signals in the form of radio frequency signals from an area. Auxiliary reflector antenna 304 is configured to receive radio frequency signals from a portion of the area. In particular, auxiliary reflector antenna 304 may be pointed at the portion of the area in which interference is present.

Further, if auxiliary reflector antenna 304 is not pointed to the portion where interference is present, at least one of physical movements, beam forming, spatial filtering, or other techniques may be used to point auxiliary reflector antenna 304 to receive radio frequency signals from the portion of the area. In the illustrative examples, auxiliary reflector antenna 304 may scan the area to identify the portion of the area in which interference is present.

In this illustrative example, main reflector antenna 302 is connected to summing unit 312 through first path 316. Auxiliary reflector antenna 304 is connected to summing unit 312 through second path 318.

Main reflector antenna 302 and auxiliary reflector antenna 304 are configured to convert the communications signals received as radio frequency signals into electrical signals. The electric signals may be processed, retransmitted as radio frequency signals, or both Summing unit 312 is configured to add the electrical signals generated by antennas in a manner that cancels the interference received by main reflector antenna 302. In this illustrative example, first path 316 and second path 318 are formed using wires that are configured to carry electrical signals.

In this illustrative example, summing unit 312, adjustable delay line 306, attenuator 308, and phase shifter 310 are examples of components that may be implemented in signal processor 232 for interference mitigation system 218 in FIG. 2. These components may form nulling network 320 for use in reducing the interference.

Summing unit 312 is configured to sum the electrical signals in a manner that cancels the interference received by main reflector antenna 302. Adjustments to the signals generated by auxiliary reflector antenna 304 may be performed such that interference may be reduced when these electrical signals are summed with the electrical signals from main reflector antenna 302 at summing unit 312.

In this illustrative example, first path 316 and second path 318 may have different distances to summing unit 312. As a result, adjustments may be made to take into account the delays, phase differences, or other changes in the transmission of electrical signals over these two paths. In the illustrative example, adjustable delay line 306 is an example of a component that may be used to make an adjustment.

As depicted, attenuator 308 is configured to change the level of power in the electrical signals on second path 318 such that the power level of the interference in the electrical signals on second path 318 is substantially the same level as the power level of the interference in the electrical signals on first path 316. This adjustment is made because the power level in the electrical signals on second path 318 is typically greater than the power level of the electrical signals on first path 316.

Differences in phase between the electrical signals over the two paths may be adjusted by phase shifter 310. Phase shifter 310 may adjust the phase of the interference in the electrical signals on second path 318 such that the interference in the electrical signal on second path 318 cancels out the corresponding portion of the interference in the electrical signals on first path 316.

For example, the phase of the interference in the electrical signals on second path 318 is adjusted such that the phase of the electrical signals with the interference is substantially 180 degrees out of phase with the interference in the electrical signals on first path 316. As a result, the electrical signals output by summing unit 312 have a reduced amount of interference. The reduced amount of interference may be a total cancellation of the interference in some illustrative examples.

The illustration of communications system 300 in FIG. 3 is only meant as one example of the manner in which communications system 210 in FIG. 2 may be implemented. This illustration is not meant to limit the manner in which other illustrative examples may be implemented.

For example, summing unit 312 may subtract the electrical signals generated by auxiliary reflector antenna 304 from the electrical signals generated by main reflector antenna 302. With this illustrative example, phase shifter 310 is configured to adjust the phase of the electrical signals with the interference along second path 318 to correspond or match the phase of the interference in the electrical signals along first path 316. In other words, the electrical signals along second path 318 are ones that represent the interference. The lexical signals along first path 316 include the desired information as well as the interference.

As another example, adjustable delay line 306, attenuator 308, phase shifter 310, and summing unit 312 may be implemented using a processor, such as a digital signal processor, rather than as discrete components shown in this illustrative example.

Figure 4:
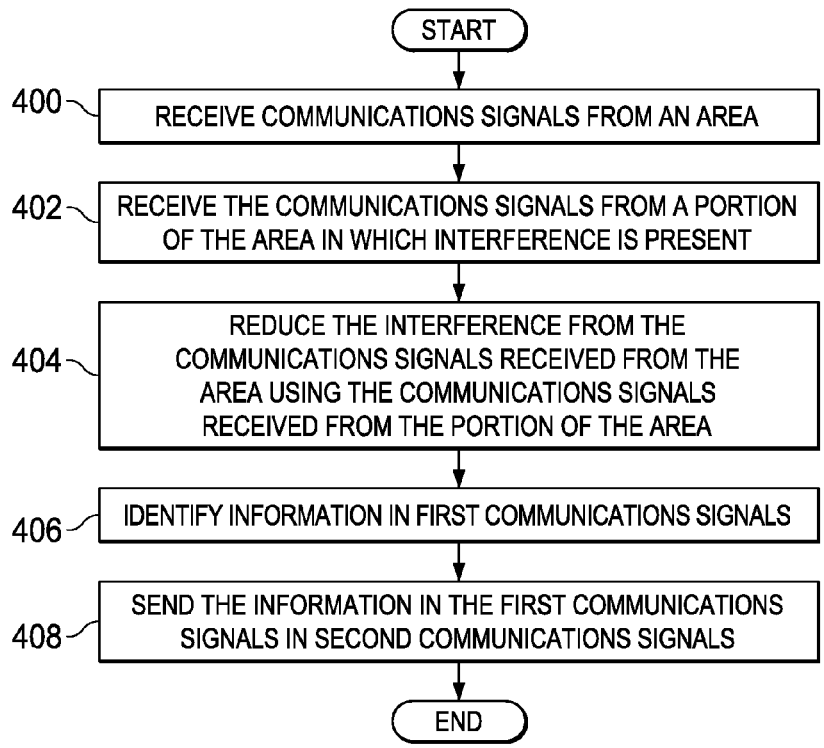
FIG. 4 is an illustration of a flowchart of a process for processing communications signals in accordance with an illustrative embodiment.

Turning next to FIG. 4, an illustration of a flowchart of a process for processing communications signals is depicted in accordance with an illustrative embodiment. The process illustrated in FIG. 4 may be implemented in communications environment 200 in FIG. 2. In particular, the process may be implemented in signal processor 232 in interference mitigation system 218 in FIG. 2.

The process begins by receiving communications signals from an area (operation 400). In the illustrative example, the communications signals take the form of radio frequency signals. The process also receives the communications signals from a portion of the area in which interference is present (operation 402). The process reduces the interference from the communications signals received from the area using the communications signals received from the portion of the area (operation 404).

The process then identifies information in first communications signals (operation 406). The process sends the information in the first communications signals in second communications signals (operation 408), with the process terminating thereafter.

Figure 5:
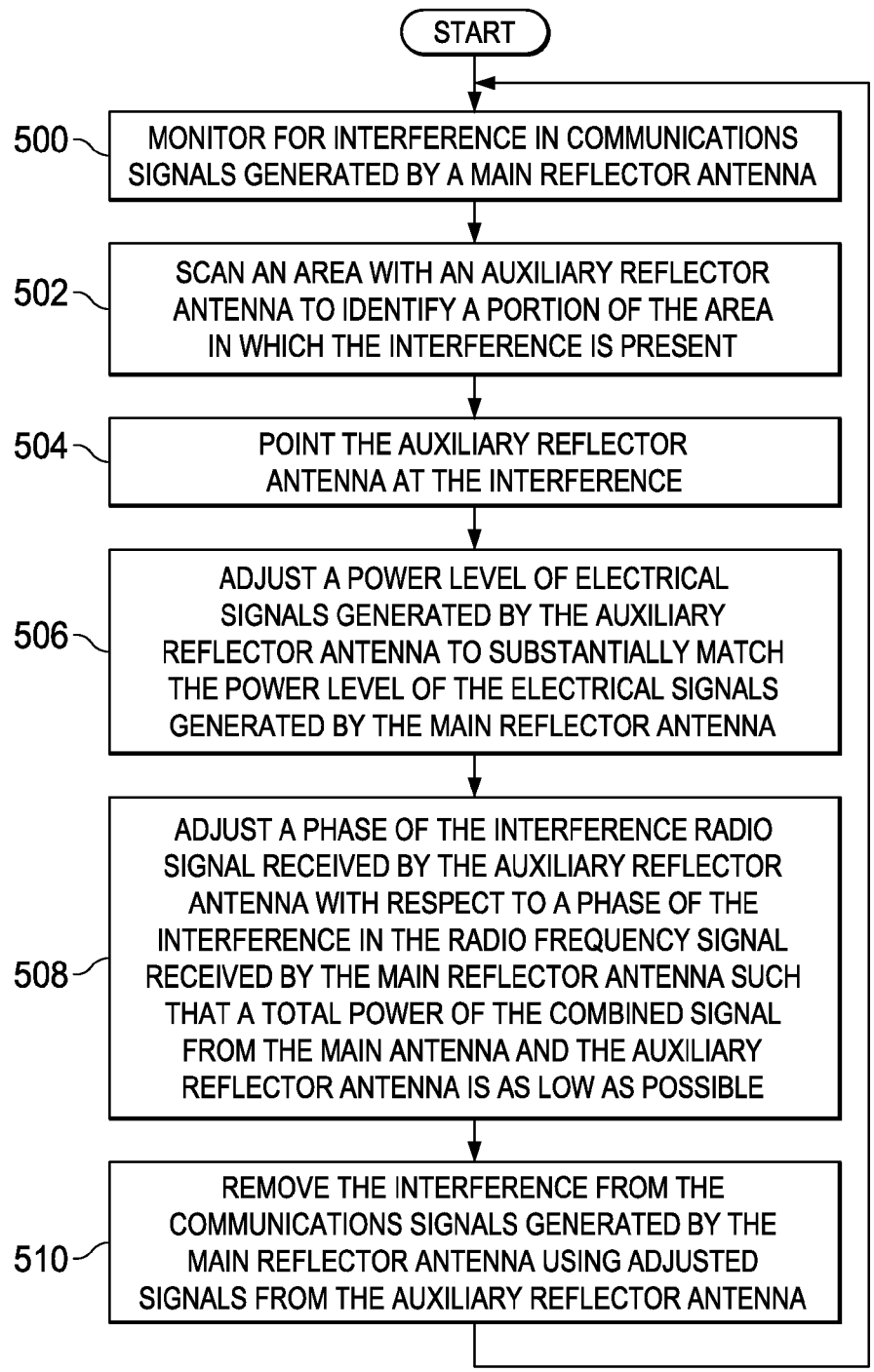
FIG. 5 is an illustration of a flowchart of a process for reducing interference in accordance with an illustrative embodiment.

With reference now to FIG. 5, a flowchart of a process for reducing interference is depicted in accordance with an illustrative embodiment. The process illustrated in FIG. 5 may be implemented in communications environment 200 in FIG. 2. In particular, the process may be implemented in signal processor 232 in interference mitigation system 218 in FIG. 2.

The process begins by monitoring for interference in communications signals generated by a main reflector antenna (operation 500). In operation 500, the interference is detected in a number of different ways. For example, the interference may be detected when a drop in the performance or quality of the communications signals is present. For example, the quality of verbal speech may drop below some desired level. In another example, an error bit rate may increase to a level greater than some threshold or desired level.

When interference is detected, the process scans an area with an auxiliary reflector antenna to identify a portion of the area in which the interference is present (operation 502). This operation is performed in this illustrative example to identify the location of the source of the interference within the area of coverage by the main reflector antenna. When interference appears, the presence of the interference is detected by the main reflector antenna as the performance degrades. The location of the interference is unknown at this point. In operation 502, scanning of the auxiliary antenna beam occurs over the area of coverage to find the location of the interference. In operation 504, the power of the electrical signals generated by the auxiliary reflector antenna from the radio frequency signals containing the interference is monitored. The location of the interferer coincides with the point where the power from the electrical signals is at a maximum.

Of course, in other illustrative examples, other factors other than or in addition to power may be configured to identify the presence of interference in the communications signals. For example, the nature of the interference signal may not conform to modes for the expected communications signals. Also, the location of the transmission of the interference may not match known locations for expected transmissions. As a result, other factors such as identifying frequencies of the communications signals, origins of the communications signals, and other factors also may be used in operation 502.

The process then points the auxiliary reflector antenna at the interference (operation 504). In this operation, the final pointing of the auxiliary antenna in the direction of the location of the interference is based on the measurements taken during operation 504. In other words, the auxiliary reflector antenna is pointed such that the beam of the auxiliary reflector antenna receives the interference at the maximum level.

The process then adjusts a power level of electrical signals generated by the auxiliary reflector antenna to substantially match the power level of the electrical signals generated by the main reflector antenna (operation 506). In this illustrative example, the attenuator is adjusted based on the pointing of the auxiliary antenna and the known difference between the gain of the main antenna and the auxiliary antenna. This type of adjustment may also be referred to as equalization of power levels. The adjustment of the power level is performed such that cancellation or reduction of the interference in the electrical signals generated by the main reflector antenna may be performed using the communications signals generated by the auxiliary reflector antenna.

The process then adjusts the phase of the interference radio frequency signal received by the auxiliary reflector antenna with respect to the phase of the interference in the radio frequency signal received by the main reflector antenna such that the total power of the combined signal from the main antenna and the auxiliary antenna is as low as possible (operation 508). In operation 508, the adjustment is made by adjusting the electrical signals generated by the different antennas from the radio frequency signals received by those in attendance. When the power is a minimum or as low as possible, the interference is reduced to some minimum amount. In one illustrative example, operation 508 may be performed such that the phase of the electrical signals from the auxiliary reflector antenna are about 180 degrees out of phase from the electrical signals in the main reflector antenna.

Thereafter, the process removes the interference from the communications signals generated by the main reflector antenna using adjusted signals from the auxiliary reflector antenna (operation 510). The process then returns to operation 500.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

For example, operation 400 and operation 402 are shown as being sequential in the flowchart in FIG. 4. These operations may be performed at substantially the same time in a reverse order rather than in the order shown.

For example, operation 408 may be omitted. In some cases, the communications signals received from the area may be processed and may not be transmitted to another location.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 6:
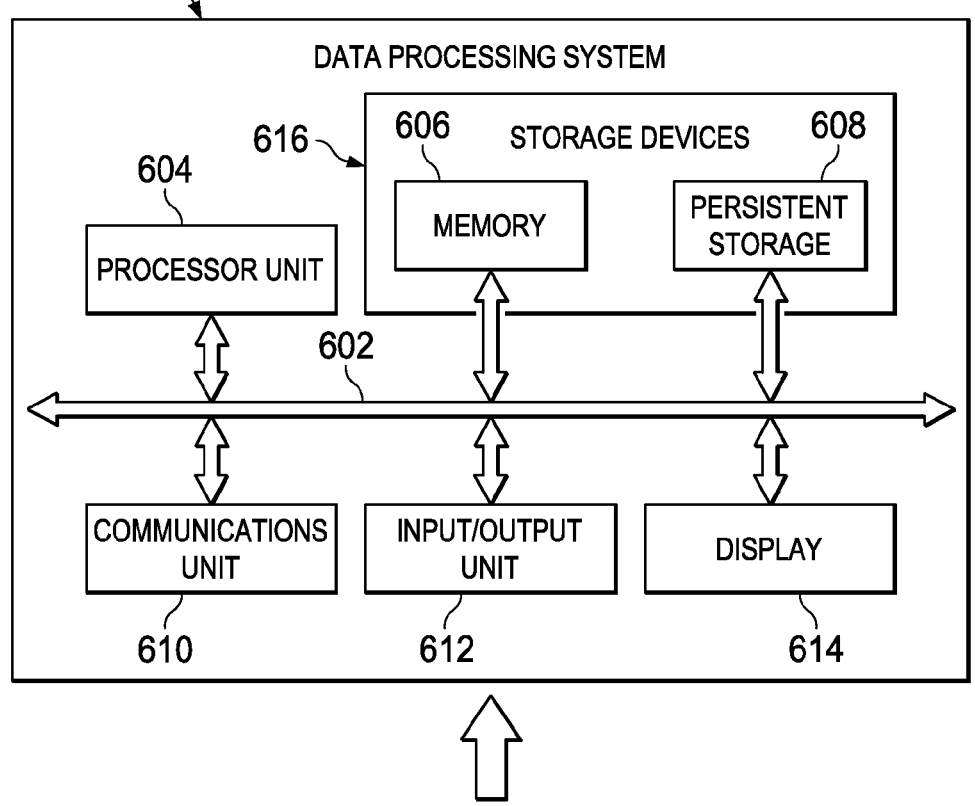
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement one or more components in communications environment 200. For example, data processing system 600 may be used to implement interference mitigation system 218. In particular, signal processor 232 may be found in hardware such as data processing system 600.

In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Thus, the illustrative embodiments provide a method and apparatus for reducing interference in communications signals. A main reflector antenna and an auxiliary reflector antenna may be used to receive communications signals in a desired manner. In one illustrative example, the main reflector antenna receives communications signals from an area. The auxiliary reflector antenna may be configured to receive communications signals containing interference from a portion of an area in which interference is present.

Further, the auxiliary reflector antenna may reduce the impact on the reception of communications signals by the main reflector antenna. As depicted, the main reflector antenna may have many different designs. For example, the reflector used in the main reflector antenna may have different shapes, sizes, and other parameters. The separation of the auxiliary reflector antenna reduces constraints on the shape of a reflector for the main reflector antenna as compared to when the auxiliary antenna is combined with the main antenna.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a main reflector antenna on a satellite configured to receive communications signals from an area, wherein the communications signals include desired information and interference; and
an auxiliary reflector antenna on the satellite configured to scan the area to identify a location in a portion of the area where a source of the interference is located, point to the location when the location of the interference is identified, and receive the interference from the portion of the area in which the interference is present, wherein the portion is a subset of the area.

2. The apparatus of claim 1 further comprising:
a signal processor configured to reduce the interference in the communications signals from the area received by the main reflector antenna using the interference received by the auxiliary reflector antenna from the portion of the area in which the interference is present.

3. The apparatus of claim 2, wherein the signal processor receives the communications signals received by the main reflector antenna through a first path and receives the interference received by the auxiliary reflector antenna through a second path.

4. The apparatus of claim 3, wherein the signal processor is configured to take into account a difference between the first path and the second path in reducing the interference in the communications signals from the area received by the main reflector antenna using the interference from the portion of the area in which the interference is present.

5. The apparatus of claim 2, wherein the signal processor comprises a nulling network.

6. The apparatus of claim 5, wherein the nulling network comprises:
an adjustable delay line;
an attenuator; and
a phase shifter.

7. The apparatus of claim 1, wherein the main reflector antenna and the auxiliary reflector antenna are separated from each other by a distance.

8. The apparatus of claim 1, wherein the area is located on earth or in outer space.

9. The apparatus of claim 1, wherein the communications signals are radio frequency signals.

10. The apparatus of claim 1, wherein the communications signals from the area are received as a first beam by the main reflector antenna and the interference from the portion of the area is received as a second beam by the auxiliary reflector antenna.

11. A satellite antenna system comprising:
a main reflector antenna on a satellite configured to receive communications signals from an area, wherein the communications signals include desired information and interference;

an auxiliary reflector antenna on the satellite configured to scan the area to identify a location in a portion of the area where a source of the interference is located, point to the location when the location of the interference is identified, and receive the interference from the portion of the area in which the interference is present, wherein the portion is a subset of the area; and a signal processor on the satellite configured to reduce the interference in the communications signals from the area received by the main reflector antenna using the interference received by the auxiliary reflector antenna from the portion of the area in which the interference is present.

12. The satellite antenna system of claim 11, wherein the main reflector antenna and the auxiliary reflector antenna are separated from each other by a distance.

13. The satellite antenna system of claim 11, wherein the area is located on earth or in outer space.

14. The satellite antenna system of claim 11, wherein the communications signals are radio frequency signals.

15. A method for processing communications signals, the method comprising:

receiving from a main reflector antenna on a satellite the communications signals from an area, wherein the communications signals include desired information and interference;

scanning the area with an auxiliary reflector antenna on the satellite to identify a location in a portion of the area where a source of the interference is located, wherein the portion is a subset of the area;

pointing the auxiliary reflector antenna to the location when the location of the interference is identified;

receiving from the auxiliary reflector antenna the interference from the portion of the area in which the interference is present; and reducing the interference in the communications signals received from the main reflector antenna using the interference received from the auxiliary reflector antenna from the portion of the area.

16. The method of claim 15, wherein the communications signals are first communications signals and further comprising:

identifying the desired information in the first communications signals; and sending the desired information in the first communications signals to second communications signals.

17. The method of claim 15, wherein the main reflector antenna and the auxiliary reflector antenna are separated from each other by a distance.

18. The method of claim 15, wherein the communications signals are radio frequency signals.

* * * * *